(12) United States Patent
Boehl et al.

(10) Patent No.: US 8,316,235 B2
(45) Date of Patent: Nov. 20, 2012

(54) METHOD AND DEVICE FOR MANIPULATION-PROOF TRANSMISSION OF DATA

(75) Inventors: Eberhard Boehl, Reutlingen (DE); Michael Boehl, Stuttgart (DE); Paulius Duplys, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 364 days.

(21) Appl. No.: 12/701,163

(22) Filed: Feb. 5, 2010

(65) Prior Publication Data

US 2010/0208886 A1 Aug. 19, 2010

(30) Foreign Application Priority Data

Feb. 16, 2009 (DE) .......................... 10 2009 000 869

(51) Int. Cl.
*H04L 9/00* (2006.01)
*H04L 9/32* (2006.01)

(52) U.S. Cl. ........... 713/168; 713/181; 713/189; 380/46
(58) Field of Classification Search ................ 380/29, 380/38, 46, 217, 262, 265, 28; 713/168, 713/170–171, 174, 181
See application file for complete search history.

(56) References Cited

U.S. PATENT DOCUMENTS

| 5,664,016 A | * | 9/1997 | Preneel et al. | 380/28 |
| 7,336,783 B2 | * | 2/2008 | Park | 380/28 |
| 2008/0240419 A1 | * | 10/2008 | Sandberg et al. | 380/2 |

* cited by examiner

*Primary Examiner* — Hosuk Song
(74) *Attorney, Agent, or Firm* — Kenyon & Kenyon LLP

(57) ABSTRACT

A method for the manipulation-proof transmission of data from a transmitter to a receiver, a test part being generated in the transmitter from the data using a secret key and communicated together with the data to the receiver, where a verification test part is generated from the received data using the same secret key and is compared to the received test part. Before the generation of the test part, the data are nonlinearly compressed using at least one feedback shift register. In addition, a device for the manipulation-proof transmission of data.

14 Claims, 3 Drawing Sheets

METHOD AND DEVICE FOR MANIPULATION-PROOF TRANSMISSION OF DATA

FIELD OF THE INVENTION

The present invention relates to a method for the manipulation-proof transmission of data from a transmitter to a receiver, a test part being generated in the transmitter from the data using a secret key and being transmitted together with the data to the receiver, where the same secret key is used to generate a verification test part from the received data, and the verification test part is compared to the received test part.

The present invention further relates to a device for the manipulation-proof transmission of data, in particular for carrying out the above-described method, having a transmitter that has a first encryption unit for generating a test part from the data using a secret key, and having a receiver that has a second encryption unit for generating a verification test part using the same secret key, as well as a comparator unit for comparing the received test part to the generated verification test part.

BACKGROUND INFORMATION

In general, known methods are referred to as MAC (Message Authentication Code) methods. In cryptography, the MAC method is used for the authentication of a transmitted message, and thus to protect against undetected manipulation of the transmitted message. For example, such methods are used in the Internet (e-mail, online banking), or also in chip cards, where signatures are used to secure the integrity of the data. In the known MAC methods, the data that are to be transmitted are successively encrypted block by block; in particular in CBC-MAC methods, the encrypted data of a block are each antivalently linked to the next data block and the data thus obtained are then re-encrypted. The so-called MAC is transmitted/communicated to the receiver in addition to the data, as a test part. The generation of the test part takes place using a secret key that is also available in the receiver. In this way, in the receiver the data can be subjected to the same procedure as in the transmitter, the same secret key being used to generate a test part for verification, i.e. a verification test part. If comparison of the verification test part with the test part results in agreement, it can be concluded that the transmitted data are intact.

SUMMARY OF THE INVENTION

However, because the test part (MAC) is a mapping from a larger data space into a smaller data space, it is thus always also possible to generate the test part through other data, or, in other words, to generate the same test part from different original data.

The method according to the present invention is distinguished in that before the generation of the test part, i.e. before the encryption is carried out, at least one feedback shift register is used to compress the data in nonlinear fashion. Compared to the CBC-MAC method, this has the advantage that only one encryption takes place for the data blocks combined in the MAC. Thus, it is provided that before the test part is generated from the data using the secret key, a nonlinear signature (digest) of the data is created; for this purpose, at least one feedback register, preferably a nonlinear feedback shift register, is used. Through the generation of the nonlinear signature in the transmitter and the encryption using the secret key, a manipulation of the transmitted data can be recognized, because the MAC is tested for validity in the receiver. In particular in contrast to linear compression methods in which the superposition principle is used, enabling easy manipulation, the method according to the present invention offers a secure transmission of the data, protected against manipulation. The advantageous method makes it significantly more difficult for an attacker to determine the method, and in particular the secret key, through trials ("brute force" methods) or through other methods. Because the nonlinear compression is carried out in the transmitter, the attacker does not have access to the intermediate result, i.e. the signature that is then to be encrypted. As a result, it is not possible for the attacker to separately attack one of the two parts, i.e. the compression method or the encryption. The attacker also does not receive any feedback from the system regarding the success of his attack. It is not possible for the attacker to check whether a plain text (=data)/cipher text (=MAC) pair manipulated by him is evaluated as valid.

Advantageously, for the nonlinear compression a feedback shift register is selected having at least two different compression functions. Particularly preferably, for the nonlinear compression the compression function is selected as a function of an input signal.

Particularly preferably, for this purpose a nonlinear feedback multiple input shift register (NLMISR) is used. Here, switching takes place as a function of an input signal between at least two different linear feedback shift registers, or polynomials, that are wired in integrated fashion in a shift register. The advantageous nonlinearity in the signature during the compression of the data is generated by the switching between the linear feedback shift registers as a function of the input signal. The NLMISR advantageously forms at least two primitive polynomials between which it is possible to switch. In this way, a nonlinear data compression can be carried out in a particularly simple fashion. Advantageously, the data signal that supplies the data is used as the input signal. Thus, here for example the output signal of a sensor can be used as the input signal.

Furthermore, it is advantageously provided that a random number (seed) generated in the receiver is communicated to the transmitter in order to be used as an initial value for the nonlinear compression. Appropriately, the random number is encrypted both in the transmitter and in the receiver with the (current) secret key. This encrypted value (result) is then not sent back from the actual transmitter to the receiver, but rather is used as an initial value of the NLMISR for the nonlinear compression just as in the receiver. In this way, all subsequently transmitted data of the transmitter are a function of the current random number. In this way, an additional authentication is offered and the protection against manipulation is further increased. Here as well, an attacker will receive no feedback from the system as to whether his attack was successful. This authentication differs from the otherwise standard explicit "challenge-response" authentication in the use of a CBC-MAC, in which, in order to authenticate a transmitter, the receiver sends a random number to the transmitter as the "challenge" and the transmitter then sends this random number back to the receiver in encrypted form as the "response."

Particularly preferably, the random number is newly generated in or by the receiver for each case of use and/or at determined temporal intervals. It is thus provided that the random number is newly generated either each time the system is switched on (case of use) and/or regularly at determined points in time, or at determined time intervals. In this way, the authentication can be renewed as often as desired, so that the protection against manipulation is further increased.

Of course, it is also conceivable to prespecify the determined time intervals using a random generator.

According to a development of the present invention, the nonlinearly compressed data, i.e. the signature of the data, are compressed using the AES algorithm or using some other suitable method. The AES (Advanced Encryption Standard) algorithm encrypts a 128-bit data block using an at least 128-bit secret key in at least 10 rounds, using substitution and permutation methods. However, 64-bit block encryption methods may also be used, which however if possible should also use more than 64 bits for the key, or should use a plurality of 64-bit keys. Here, various methods may be used, such as TEA, XTEA, 2DES, 3DES, IDEA, or the like.

In addition, it is provided that the random number is transmitted with an additional CRC value. The CRC value is a test value that is determined using the CRC (Cyclic Redundancy Check) method in order to enable recognition of errors in the transmission or replication of data The CRC method is known to those skilled in the art, so that it is not described in more detail here.

Finally, it is provided that the method can be carried out symmetrically or asymmetrically. Given symmetrical execution, in the transmitter and the receiver the data are each encrypted using the same secret key, whereas in the asymmetrical method an additional decryption of the data takes place in the receiver.

The device according to the present invention is distinguished in that a nonlinear feedback shift register that is connected before the encryption unit is allocated to the transmitter. Advantageously, the shift register has two integrated linear feedback shift registers between which switching takes place, using a switch operator, as a function of an input signal, preferably the input signal that supplies the data. Particularly preferably, the nonlinear feedback shift register is fashioned as a nonlinear feedback shift register having multiple inputs (NLMISR), i.e. having a plurality of coupled-in input signals.

DETAILED DESCRIPTION

Figure 1:
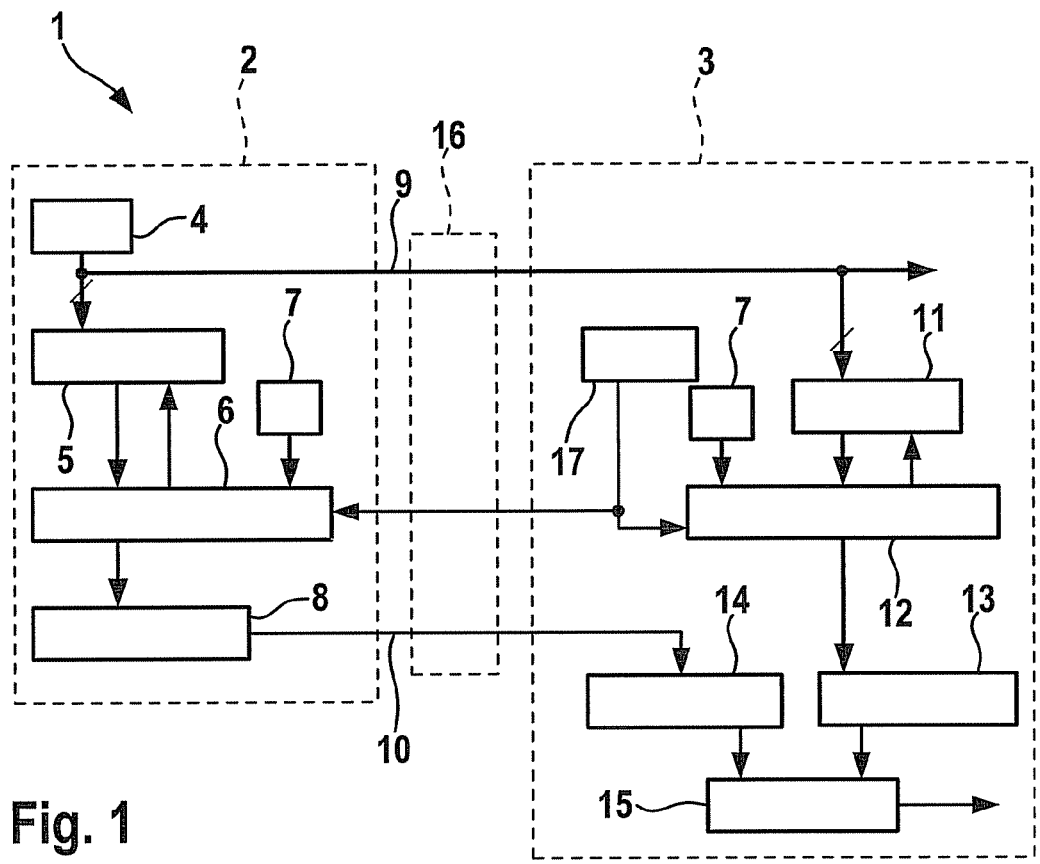
FIG. 1 shows a first exemplary embodiment of a device for the manipulation-proof transmission of data, in a schematic representation.

FIG. 1 shows, in a schematic representation, an exemplary embodiment of a possible realization of the device according to the present invention for the manipulation-proof transmission of data from a transmitter 2 to a receiver 3.

A sensor 4 is allocated to transmitter 2, the output signal of said sensor supplying data that are to be communicated from transmitter 2 to receiver 3. In addition, a nonlinear feedback shift register 5 having multiple inputs (NLMISR=NonLinear Multiple Input Shift Register) is allocated to transmitter 2 for the nonlinear compression of the data coming from sensor 4. After a desired/provided number of data have been compressed to form a nonlinear signature in NLMISR 5, said signature is encrypted according to a standard method in a first encryption unit 6, using a secret key 7. The MAC (Message Authentication Code) formed as a test part in this way is first stored in a buffer memory 8 of transmitter 2 and is subsequently communicated (in whole or in part) to receiver 3 together with the data, as is indicated by arrows 9 and 10. Receiver 3, which is for example an ECU (Electronic Control Unit), has allocated to it an NLMISR 11 that is identical to NLMISR 5 and that nonlinearly compresses the received data of sensor 4. After the provided number of data are present in compressed form as a nonlinear signature in shift register 11, this signature is encrypted in an encryption unit 12, which uses the same method as encryption unit 6, to form a verification test part. As an encryption method, here for example the AES method can be used. Encryption unit 12 here operates with the same secret key 7 as does transmitter 2, or encryption unit 6.

To this extent, in receiver 3 the same procedure is carried out as in transmitter 2. The verification test part created by encryption unit 12 is stored in a buffer 13 of receiver 3. Likewise, the test part sent by transmitter 2 is stored in a buffer 14 of receiver 3.

Using the verification test part, a verification, or authentication, of transmitter 2, or of the transmitted data, is carried out. For this purpose, the test part and the verification test part are simply compared to one another in receiver 3, in a comparator unit 15. If the generated verification test part agrees with the received test part, the received data are considered to be unfalsified, whereas if agreement is not present an error is signaled that, repeatedly if warranted, authorizes the conclusion that the data has been manipulated. If the test part and the verification test part agree, the data of sensor 4 are forwarded for signal processing.

Due to the advantageous nonlinear compression, or signing, of the data using NLMISRs 5 and 11, and on the basis of the above-described authentication methods, it is not possible for an attacker to separately attack the signature or the encryption. Because the attacker has access only to data between transmitter 2 and receiver 3, as indicated by a dashed box 16, he does not have access to the intermediate result of the nonlinear compression.

Advantageously, the initial value of the nonlinear compression in transmitter 2 and receiver 3 is a function of secret key 7, so that both the initial value and the final value of the signature are not visible to the external attacker.

Advantageously, in the receiver a random number generator 17 is provided that is fashioned for example as a TRNG (True Random Number Generator) or as a RNG (Random Number Generator). In simple cases, it can also be fashioned as a counter or as a pseudorandom generator. Advantageously, the random number, the so-called seed, is encrypted in encryption units 6 and 12 using secret key 7, and is communicated to NLMISR 5 or 11 as the so-called result. There, the encrypted random number is used as the initial value of the nonlinear compression for each data block that is to be compressed. Due to the use of secret key 7 in the encryption, the attacker does not have any chance to determine this initial value as long as the encryption algorithm and the key 7 that is used offer sufficient security. Because the encrypted random number is not sent directly back to receiver 3 (as in the otherwise standard challenge-response methods), no additional key is required for such an integrated transmitter authentication. The test parts, or verification test parts, of all the data are then each linked to the current encrypted random number. The method thus simultaneously acts as an implicit authentication of transmitter 2.

Depending on requirements, for each case of use (switching on to switching off of the device), or at determined temporal intervals, such as for example once an hour or once a minute, a new random number is generated, communicated, and then encrypted. All previously recorded data thus automatically become worthless to an attacker, because the associated test part/verification test part (MAC) is no longer correct. The implicit authentication of transmitter 2 that this brings about thus offers much greater protection against manipulation than does an explicit authentication of transmitter 2.

Advantageously, the encrypted random number is additionally transmitted with a CRC value in order to recognize bit errors due to disturbances during transmission. Likewise, each encrypted random number can be provided with a number, and the number used can be made known to the receiver in the data channel or in the MAC channel. If no confirmation message for an encrypted random number takes place at receiver 3, it must be assumed that the transmission was errored, and a new encrypted random number is transmitted. If a certain number of errored transmissions is exceeded, manipulation is presumed.

If the application does not offer a return channel for the communication of the encrypted random number from receiver 3 to transmitter 2, it is conceivable to situate random generator 17 in transmitter 2. However, the encrypted random data would then also have to be communicated to the receiver; the standard data channel may also be used for this purpose. As a component of the encrypted random number, a counter value or a timestamp could be used that can only be incremented upward during a period of use of device 1, up to an overrun value. This would make it easy to test the difference of the encrypted random numbers in receiver 3. In order to be able to successfully manipulate the data without being detected, the attacker would then have to have previously recorded the associated data sets for each encrypted random number and would have to use them for the manipulation. Due to the quantity of data required this is practically nearly impossible, and can be made even more difficult by shortening the intervals of generation of the encrypted random numbers. The advantageous device and the advantageous method are thus easily adaptable to the security requirements of the particular application.

Figure 2:
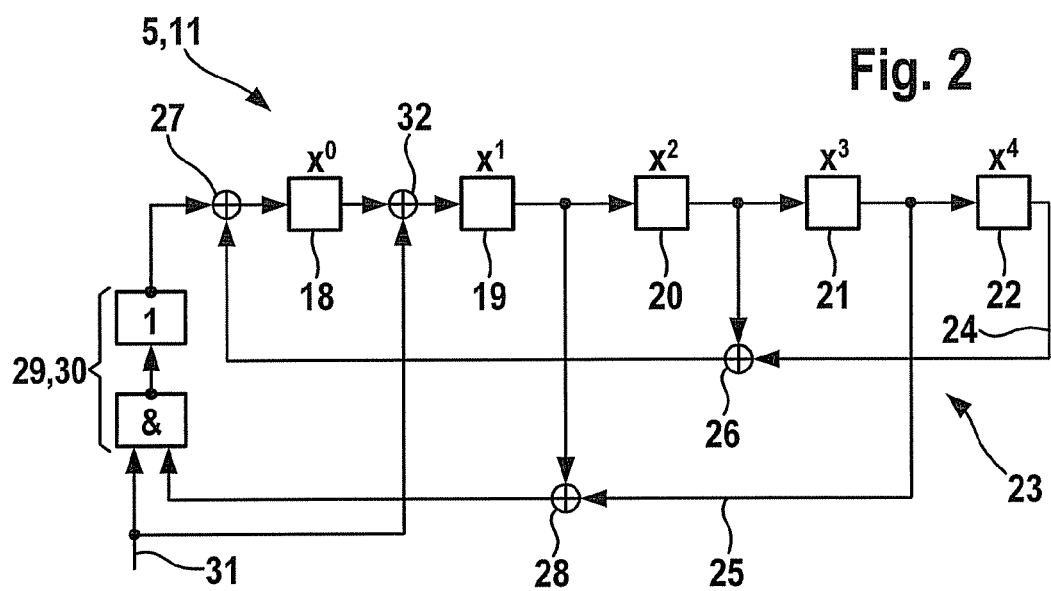
FIG. 2 shows a realization in terms of circuitry of an NLMISR.

FIG. 2 shows, in an exemplary embodiment, a realization in terms of circuitry of shift register 5, or 11, as a 5-bit NLMISR. Shift register 5, or 11, has five flip-flops 18 through 22 connected in series. For feedback, shift register 5/11 has a signal feedback 23 that is essentially divided into two branches 24 and 25. Branch 24 connects the signal outputs of flip-flops 20 and 22 to a linear operator 26 that antivalently links the signals and communicates them to a further linear operator 27. The signal output of linear operator 27 is connected to the input of first flip-flop 18. Second branch 25 of signal feedback 23 routes the output signals of flip-flops 19 and 21 to a further linear operator 28 that links them antivalently and supplies the result to a switching operator 29 that is generally fashioned as a multiplexer 30 and in the specific case depicted here is realized as an AND element. Switching operator 29, or multiplexer 30, carries out an AND function, represented here as a NAND function with subsequent inversion. As a further input signal 31, multiplexer 30 obtains the data signal coming from sensor 4 of transmitter 2. In addition, input signal 31 is simultaneously antivalently coupled in between flip-flops 18 and 19, a further linear operator 32 being provided for this purpose. The output signal of multiplexer 30 is supplied to linear operator 27 and is antivalently linked to the output signal of linear operator 26. On the basis of the particularly advantageous wiring of NLMISR 5, or 11, two polynomials are integrated between which switching takes place as a function of input signal 31. Here, branch 24 offers polynomial $p_1: x^5+x^2+1$, while given a linkage of branches 24 and 25 the polynomial $p_2: x^5+x^3+x^2+x+1$ is realized.

Figure 3:
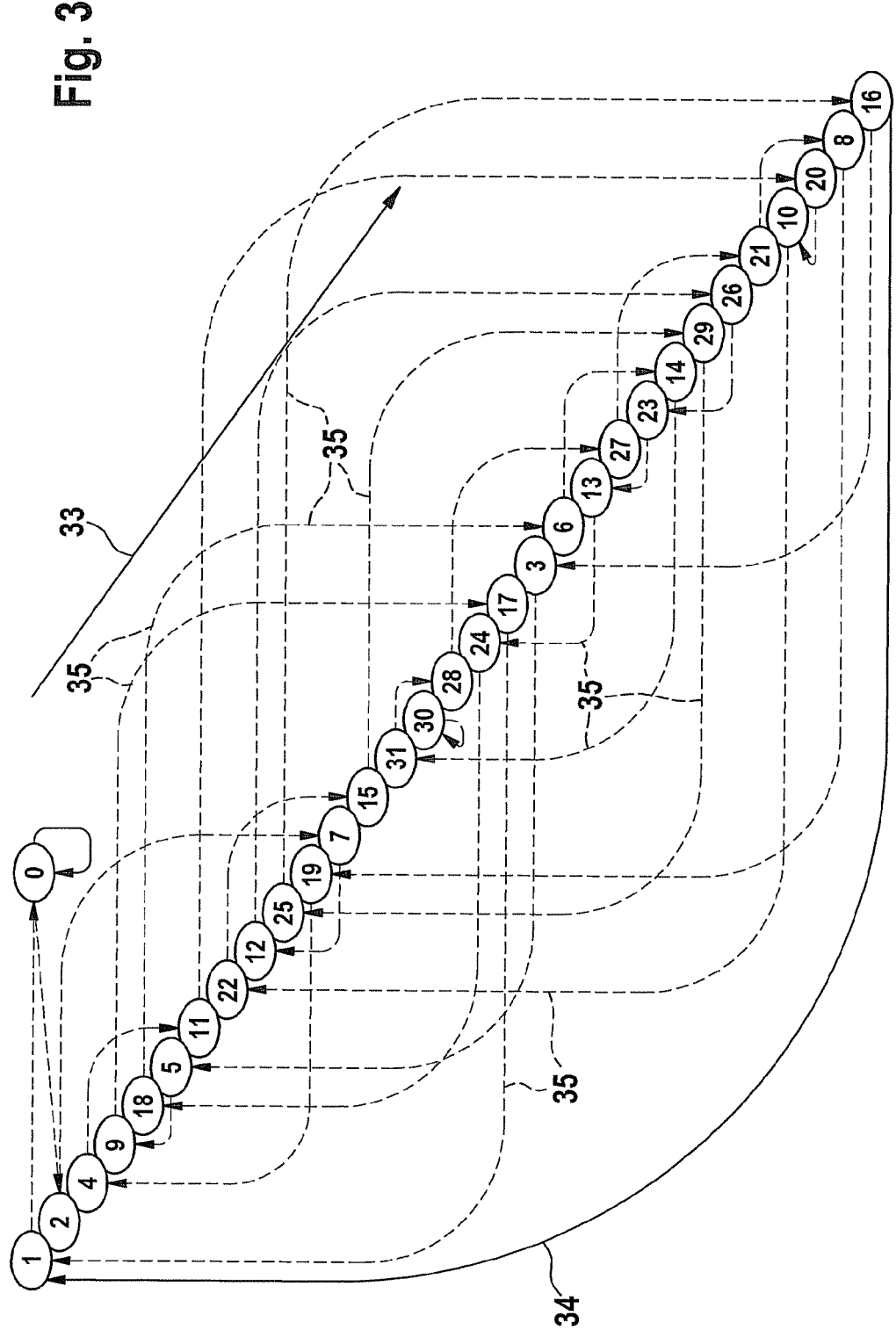
FIG. 3 shows a transition graph for the NLMISR according to FIG. 2.

The transition graph of the structure shown in FIG. 2 is shown in FIG. 3. For polynomial $p_1$, the states adjacent at the lower right are always assumed as successor states, as is indicated by a solid arrow 33. From the last state, the transition then takes place back to the first state, according to solid arrow 34. For polynomial $p_2$, the transitions are represented by dashed arrows 35, of which only some have been provided with reference characters here for reasons of clarity. As can be seen from the transition graph, all the transitions are a function of input signal 31, so that the generated signature is formed via the overall input signal. Of course, it is conceivable to couple input signal 31 into NLMISR 5/11 antivalently in parallel fashion at arbitrarily many points.

The transmit function of shift register 5/11 is a function of an initial value (as described above). Given a bit width of n bits, $2^n$ different initial values, and thus $2^n$ different compression functions, are possible. The attacker gains no information concerning the initial value of the NLMISR and thus no information concerning the compression function.

Given the general structure of the data compression with a hash function and subsequent encryption, it is required that this hash function be collision-free, because otherwise the required security is not present. Here, "collisions" are understood as meaning that it is possible to reach the same hash value with different data. Even given the same level of quality of the subsequent encryption, a manipulation of the data can otherwise be carried out without being detectable.

In the case of the advantageous present solution, the data compression in the NLMISR, or in shift register 5/11, as described above is performed not with a unified function, but with a different transmit function depending on the initial state of the NLMISR. Given, for example, a NLMISR with n=128 bits, this NLMISR has $2^{128}=3.4 \cdot 10^{38}$ different initial states, and thus the same number of compression functions. It is not necessary for each of these transmit functions to be realized in collision-free fashion. This is an important difference from the prior art, where only one compression function is used. However, it has to be required that these transmit functions as a rule do not have the same collisions.

The principle of Kerkhoff has to be assumed, according to which the attacker knows the structure of the NLMISR and therefore knows the number of all compression functions. However, if the initial state is not known to an attacker, the attacker also does not know which transmit function having which collisions is used, and therefore also does not know how he can manipulate the data in order to obtain the same signature (digest value). Here, it is not necessary for all of the $3.4 \cdot 10^{38}$ different transmit functions to bring about different collisions for any arbitrary sequence of input data; however, the percentage of these functions yielding the same digest, i.e. the same signature for the same data sequence pair, i.e. having the same collisions, must be as low as possible. Under these conditions, a very high degree of security can be achieved, because the attacker can only guess, but does not receive any feedback about the success of his attack. If the intervals at which the initial value is changed are then chosen short enough that the initial state is renewed before it can be discovered, even using the most modern computing technology and laboratory techniques, the attacker will not meet with success even in the future. The level of security of the above-described method and the above-described device can therefore advantageously be adapted to meet future requirements.

The collisions are now explained on the basis of the following example, with reference to the structure shown in FIG.

2 and the transition graph shown in FIG. 3. From initial value X=11 of shift register 5/11, using input data sequence 1010101 the final value Y=16 is obtained. The same end state is reached with the modified data sequence of the same length 0110010; that is, transmit function $h_{11}$ has a collision with the two data sequences (1010101, 0110010). If the initial state X'=3 is now taken with the same data sequences, the states Y'=12 or, respectively, Y"=23 are then obtained for the two data sequences. That is, the function $h_3$ (1010101, 0110010) does not have a collision under the same boundary conditions.

It has turned out that aside from initial state X=11 with end state Y=16, the initial state X'''=15 and end state Y'''=30 have the same property, i.e. that the same end state is reached with the two data sequences. None of the other 30 initial states have this property. If an attacker replaces the first data sequence with the second, he will meet with success only in two of 32 cases. Given an equal distribution of the 32 possible initial states, the probability of an undetected manipulation with these data is therefore 6.25%. It is to be expected that this percentage will decrease significantly given a larger bit width n and a longer data sequence. Under the boundary condition that receiver 3 does not supply feedback concerning the success of a manipulation, and a decision is carried out after the evaluation of a multiplicity of transmissions, in this case a relatively high degree of security against random manipulations is already provided. It is to be expected that the number of identical collisions of the transmit functions will decrease significantly given larger bit width n and a longer data sequence. It is to be noted that the manipulated data sequence must have the same length as the original data sequence, because an attacker does not have access to the data directly from the sensor. This further limits the sphere of action of the attacker.

Using the advantageous method and the advantageous device, it is therefore practically impossible for an attacker to manipulate a data sequence in such a way that the same end state is reached, as long as the attacker does not know the initial state and end state of the shift register, or NLMISR 5, 11. Trial and error also will not lead the attacker to a solution, because the attacker is not given feedback about the success of his attack. This follows directly from the nonlinearity of the compression, because the superposition principle then does not apply, as it does in the case of linear compression. The security of the method is reduced to the security of the encryption method used. That is, the manipulation is practically possible only if the attacker succeeds in finding out the secret key, as long as the above-described conditions are maintained.

Figure 4:
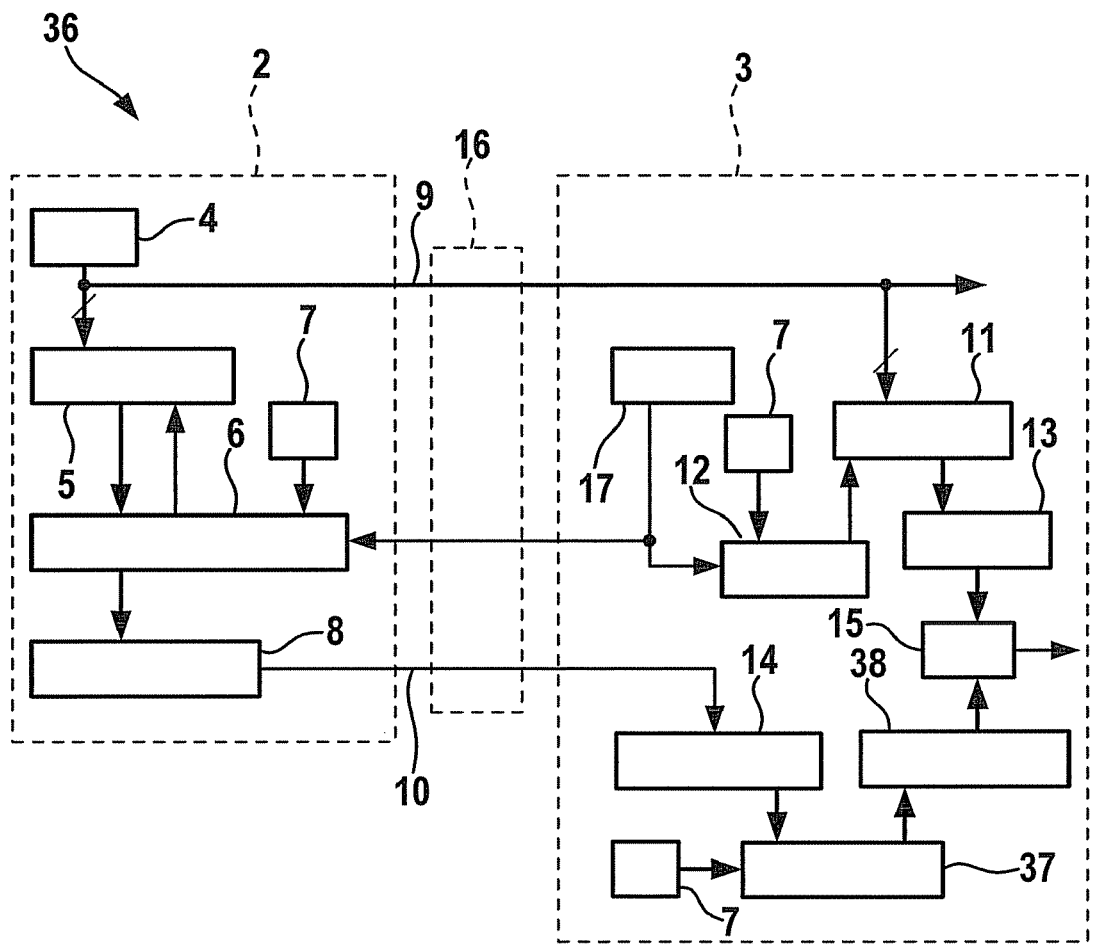
FIG. 4 shows a further exemplary embodiment of a device for the manipulation-proof transmission of data, in a schematic representation.

Finally, FIG. 4 shows a device 36 that corresponds essentially to device 1; identical elements have been given the same reference characters, so that to this extent reference is made to the description provided above. Differing from device 1, which represents a symmetrical method, in device 36 of FIG. 4 an asymmetrical method is realized. Here, in addition to encryption unit 12 a decryption unit 37 is provided in which a decryption of the test part is carried out in receiver 3, the decrypted data being stored in a buffer 38 of the receiver. It is to be noted that even in the asymmetrical method according to FIG. 4, the encryption algorithm is symmetrical; i.e., the same key is used at the transmitter and at the receiver. In contrast, an encryption method using private and public keys is much more expensive.

In principle, it is conceivable to realize the nonlinear compression and the encryption of the data itself on a small processor. If such a processor on a sensor chip, such as for example an evaluation chip of sensor 4, is realized in a chip composite, then by exchanging the program code it is also possible to use different encryptions according to different methods.

What is claimed is:

1. A method for a manipulation-proof transmission of data from a transmitter to a receiver, comprising:
   generating a test part in the transmitter from the data using a secret key;
   communicating the test part together with the data to the receiver;
   in the receiver, generating a verification test part from the received data using the same secret key and comparing the verification test part to the received test part; and
   before the generation of the test part, compressing the data in a nonlinear fashion using at least one nonlinear feedback shift register.

2. The method according to claim 1, wherein the at least one nonlinear feedback shift register implements at least two different compression functions which are used for the nonlinear compression.

3. The method according to claim 2, wherein nonlinearity in the nonlinear compression is achieved by switching between the two different compression functions as a function of an input signal.

4. The method according to claim 2, wherein the at least one nonlinear feedback shift register has multiple inputs for the nonlinear compression.

5. The method according to claim 3, wherein a data signal that supplies the data is used as the input signal.

6. The method according to claim 1, further comprising communicating a random number generated in the receiver to the transmitter in order to form therefrom an initial value for the nonlinear compression.

7. A method for a manipulation-proof transmission of data from a transmitter to a receiver, comprising:
   generating a test part in the transmitter from the data using a secret key;
   communicating the test part together with the data to the receiver;
   in the receiver, generating a verification test part from the received data using the same secret key and comparing the verification test part to the received test part;
   before the generation of the test part, compressing the data in a nonlinear fashion using at least one feedback shift register;
   communicating a random number generated in the receiver to the transmitter in order to form therefrom an initial value for the nonlinear compression; and
   encrypting the random number using the secret key after being communicated.

8. The method according to claim 6, wherein the random number is newly generated for each case of use or at determined temporal intervals.

9. The method according to claim 6, wherein the random number is transmitted with an additional CRC value.

10. The method according to claim 1, further comprising encrypting the nonlinearly compressed data using at least one of an AES, TEA, IDEA, and DES algorithm.

11. The method according to claim 1, wherein the method is carried out symmetrically or asymmetrically.

12. A device for a manipulation-proof transmission of data, comprising:
- a transmitter including a first encryption unit for generating a test part from the data using a secret key; and
- a receiver including a second encryption unit for generating a verification test part using the same secret key and including a comparator unit for comparing the received test part with the generated verification test part,
- wherein the transmitter and the receiver each have a respective nonlinear feedback shift register that is connected before the respective encryption unit, wherein the respective nonlinear feedback shift registers each have multiple inputs, and wherein the nonlinear feedback shift register of the transmitter compresses the data in a nonlinear fashion before the generation of the test part.

13. The device according to claim 12, wherein the nonlinear feedback shift register of the transmitter implements at least two different compression functions which are used for the nonlinear compression.

14. The device according to claim 13, wherein nonlinearity in the nonlinear compression is achieved by switching between the two different compression functions in the nonlinear feedback shift register of the transmitter as a function of an input signal.

* * * * *